No. 790,480. PATENTED MAY 23, 1905.
E. E. CROUCH.
ARTIFICIAL STONE MOLD.
APPLICATION FILED JULY 28, 1904.

5 SHEETS—SHEET 1.

Witnesses:
W. E. Ellis
N. W. Winters

Inventor:
E. E. Crouch,
By J. E. Sweet Atty

No. 790,480. PATENTED MAY 23, 1905.
E. E. CROUCH.
ARTIFICIAL STONE MOLD.
APPLICATION FILED JULY 28, 1904.

5 SHEETS—SHEET 2.

Witnesses:
W. E. Ellis
N. W. Winters

Inventor:
E. E. Crouch,
By ........ Att'y

No. 790,480. PATENTED MAY 23, 1905.
E. E. CROUCH.
ARTIFICIAL STONE MOLD.
APPLICATION FILED JULY 28, 1904.

5 SHEETS—SHEET 4.

Witnesses:
W. E. Ellis
N. W. Winters

Inventor:
E. E. Crouch,
By J. L. Sweet Atty

No. 790,480. PATENTED MAY 23, 1905.
E. E. CROUCH.
ARTIFICIAL STONE MOLD.
APPLICATION FILED JULY 28, 1904.

5 SHEETS—SHEET 5.

Witnesses:
W. E. Ellis
N. W. Winters

Inventor:
E. E. Crouch,
By H. Sweet Atty

No. 780,480. Patented May 23, 1905.

UNITED STATES PATENT OFFICE.

EDGAR E. CROUCH, OF TOPEKA, KANSAS, ASSIGNOR OF ONE-HALF TO J. M. KEITH, OF DES MOINES, IOWA.

ARTIFICIAL-STONE MOLD.

SPECIFICATION forming part of Letters Patent No. 790,480, dated May 23, 1905.

Application filed July 28, 1904. Serial No. 218,552.

*To all whom it may concern:*

Be it known that I, EDGAR E. CROUCH, a citizen of the United States of America, and a resident of Topeka, Shawnee county, Kansas, have invented a new and useful Artificial-Stone Mold, of which the following is a specification.

The object of this invention is to provide improved means for molding artificial stone. My invention consists in the construction, arrangement, and combination of elements hereinafter set forth, pointed out in my claims, and illustrated by the accompanying drawings, in which—

Figure 1:
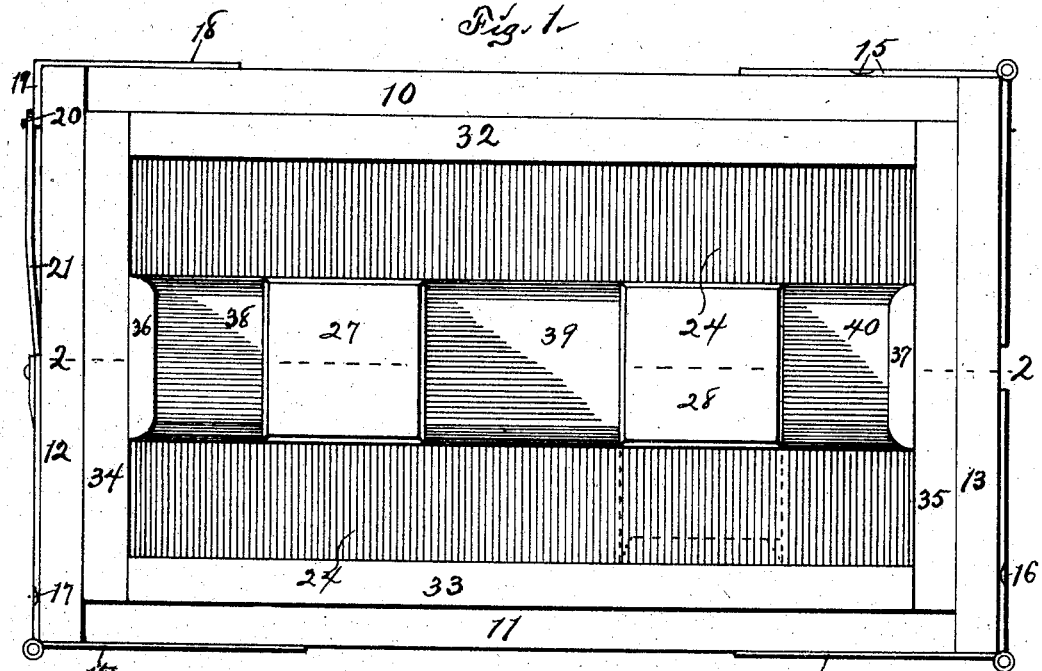
Figure 2:
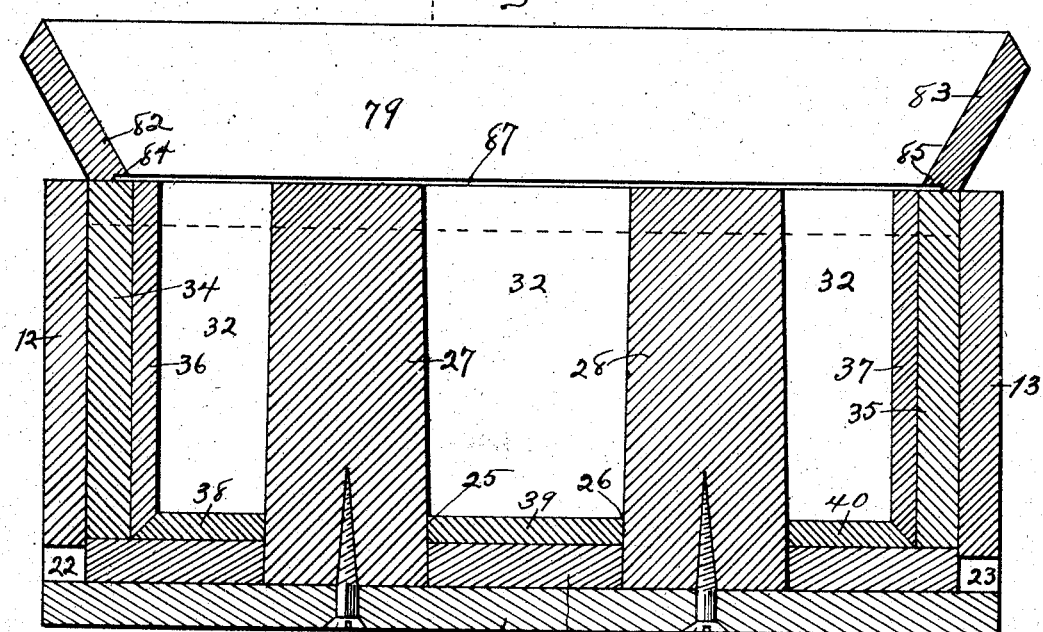
Figure 3:
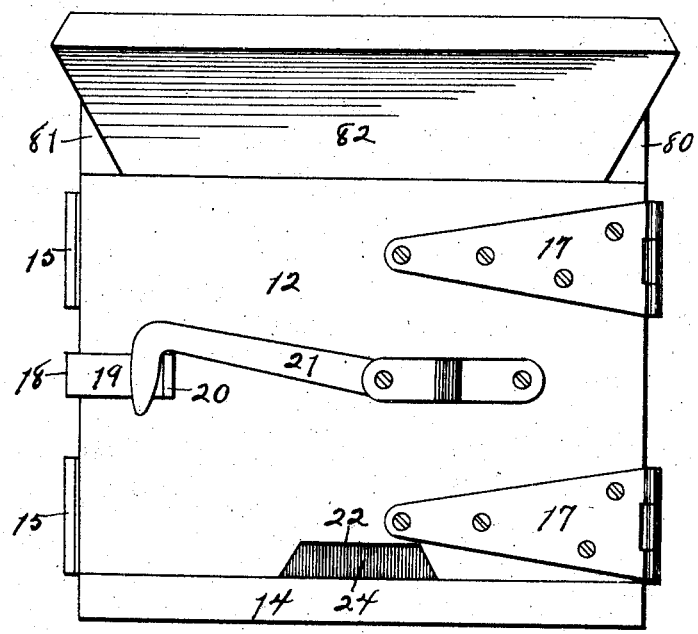
Figure 4:
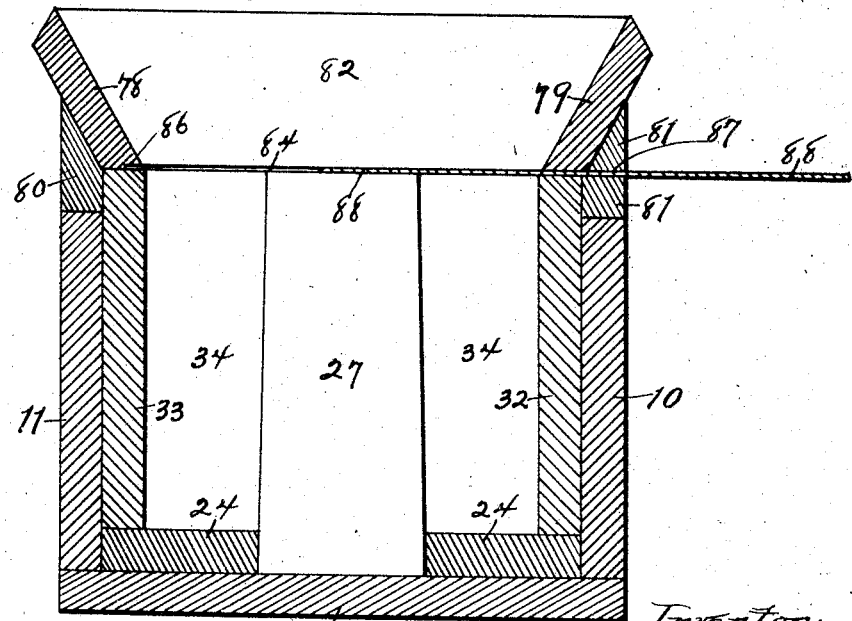
Figure 5:
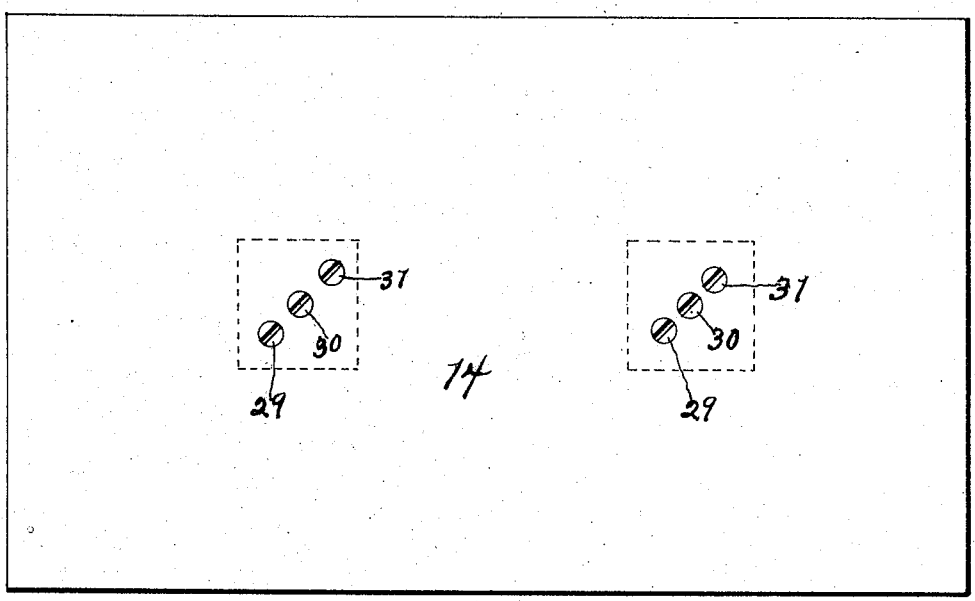
Figure 6:
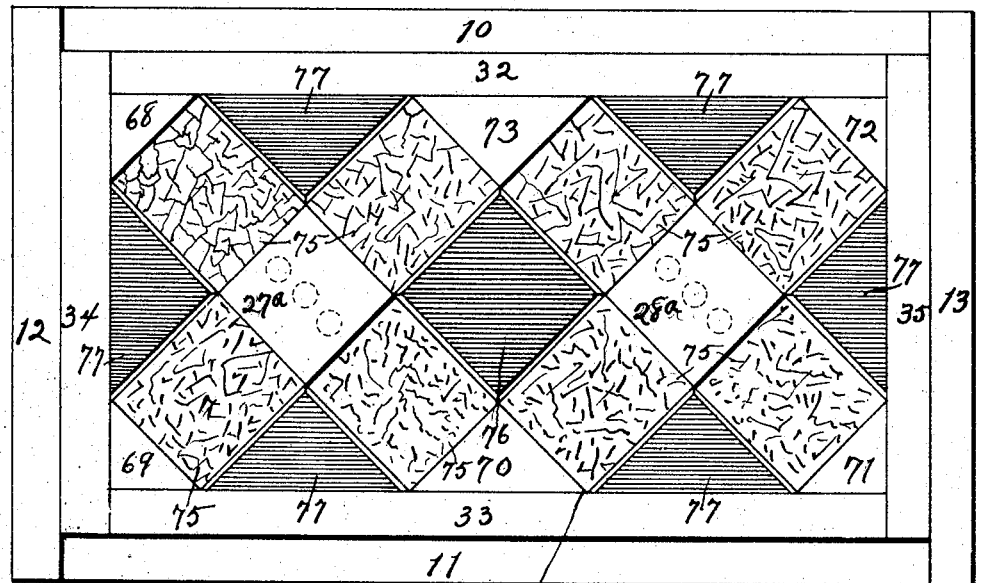
Figure 7:
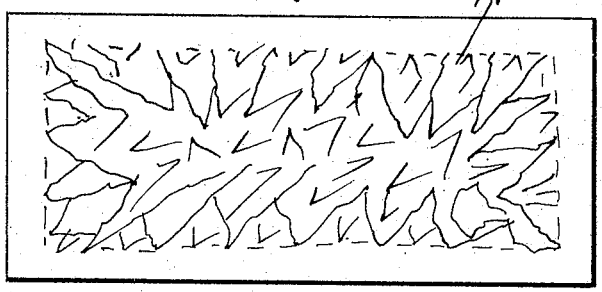
Figure 8:
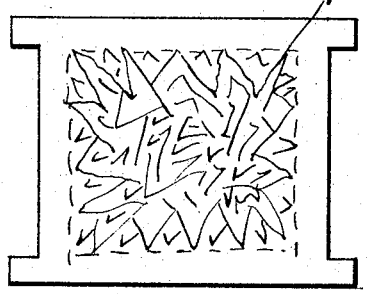
Figure 9:
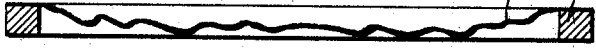
Figure 10:
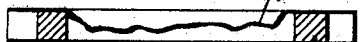
Figure 11:
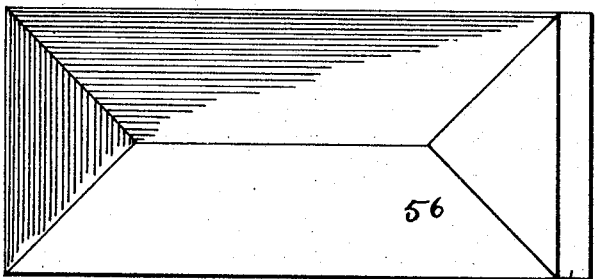
Figure 12:
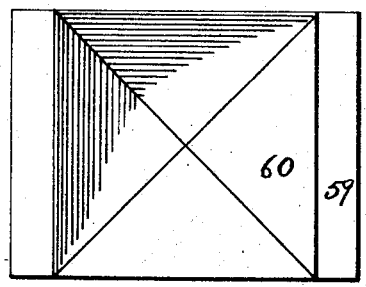
Figure 13:
Figure 14:

Figure 1 is a plan showing one form of my improved mold closed preparatory to molding a block therein, the hopper or side boards being removed. Fig. 2 is a longitudinal vertical section of the device on the indicated line 2 2 of Fig. 1, the side boards or hopper being in place and the hinges and fastening means being removed. Fig. 3 is an end elevation of the device. Fig. 4 is a vertical section of the device on the indicated line 4 4 of Fig. 2. Fig. 5 is a view of the outermost face of a removable bottom employed in my mold, also illustrating the means employed to attach and support the cores for forming holes on the blocks. Fig. 6 is a plan of the mold, the hopper being removed and a false bottom or pattern-plate mounted in the mold for the forming of an ornamental face on a block. Figs. 7, 8, 9, 10, 11, 12, 13, 14, 15, and 16 are detail views illustrating pattern-plates of various shapes employed for forming plane or ornamental faces on a block. Figs. 17, 18, 19, 20, 21, 22, 23, and 24 are views of various blocks which may be molded in my device through the use of the various pattern-plates illustrated.

Figure 15:
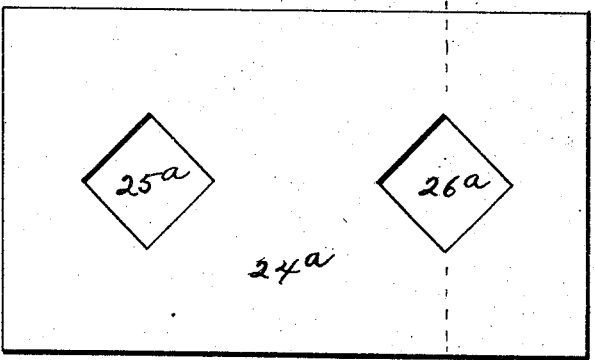
Figure 16:
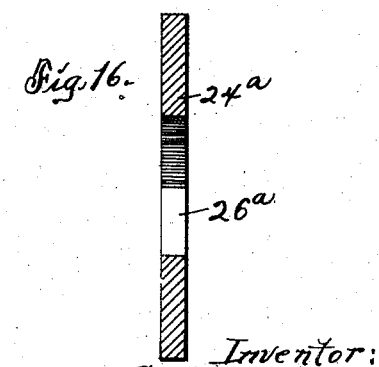

In the construction of the mold the numerals 10 11 designate the sides, 12 13 the ends, and 14 the bottom. The side 10 is connected at one end to the end 13 by hinges 15, and said end 13 is connected to the side 11 by hinges 16. The opposite end portion of the side 11 is connected to the end 12 by hinges 17. The sides 10 11 are parallel with each other, and the ends 12 13 are parallel with each other and cross and contact with the ends of the sides, respectively. A hook-bar 18 is fixed to one end portion of the side 10 and projects across the otherwise free end portion of the end 12 and is formed with a hook 19, adapted to overlie said end and bind it to the side. The hook 19 is formed with an outwardly-projecting lip 20, adapted to be engaged by a hook 21, pivoted to the end 12. It is the function of the hook-bar 18 and hook 19 to bind the end 12 to the side 10, and it is the function of the hook 21 and lip 20 to bind and lock the hook 19 to the end 12. It is the function of the hinges 15, 16, and 17 to connect the various elements and permit them to be opened outward relative to a block in the mold. The bottom 14 is of such width and length as to have its margins flush with the outer faces of the sides and ends of the mold in use, and notches 22 23 are formed in the central portions of the lower margins of the ends 12 13 to permit grasping the bottom for removal when the mold is inverted, as hereinafter described. A pattern-plate 24, in this instance formed with plane upper and lower faces, is mounted within the mold and rests on the bottom 14. The pattern-plate 24 may be imperforate when it is desired to mold solid blocks; but in this instance I presume the making of hollow blocks, and hence show the pattern-plate formed with apertures 25 26 to receive and permit the passage therethrough of cores 27 28 on the bottom. The cores 27 28 may set square with the mold and be secured to the bottom 14 by screws 29, 30, and 31 in each core. The screws extend through the bottom 14 and are seated in the cores, the screws 30 30 in the centers of the cores, and the screws 29 29 and 31 31 on either side thereof. The screws are arranged in rows obliquely to the square of the mold, or the pattern-plate may be formed, as shown in Figs. 15 and 16, with the apertures 25$^a$ 26$^a$ in the plate 24$^a$ obliquely to the square of the mold for use with cores set obliquely to the square of the mold, as shown in Fig. 6, and in such case the cores are fixed by the same screws set the same way in the bottom 14, but arranged in a row transversely of the cores parallel with the sides of the cores. Thus by loosening two screws in each core said cores may be rotated on the central screws and refixed by reseating said two screws, as shown by dotted lines in Fig. 6. Pattern-plates 32 33 are mounted on the inner faces of the sides 10 11 and are detachably fixed to said sides, preferably by small nails, the lower margins of said plates resting on the upper surface of the pattern-plate 24. The pattern-plates 32 33 preferably form the front and rear faces of the block. Pattern-plates 34 35 are mounted on the inner faces of the ends 12 13 and are detachably secured to said ends, preferably by small nails, the lower margins of said plates resting on the upper face of the pattern-plate 24 and the ends of plates 34 35 overlapping the ends of the plates 32 33. Cores 36 37 may be fixed to the inner face of the central portions of the pattern-plates 34 35, and cores 38 39 40 may be fixed to the upper face of the pattern-plate 24.

Figure 17:
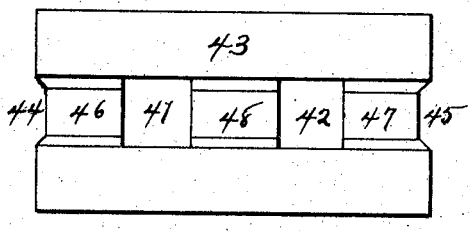
Figure 18:
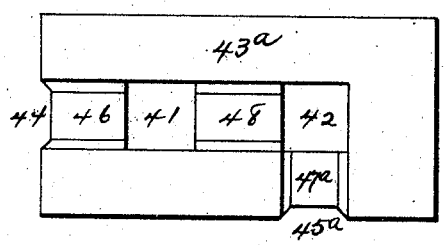
Figure 19:
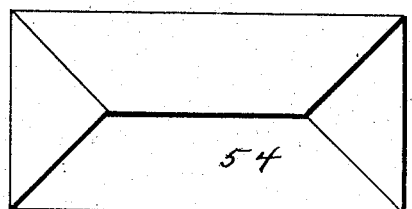
Figure 20:
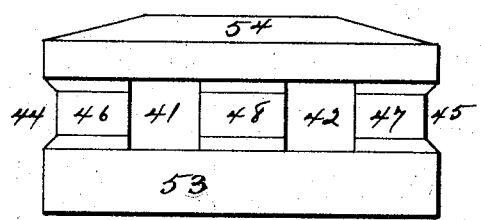
Figure 21:
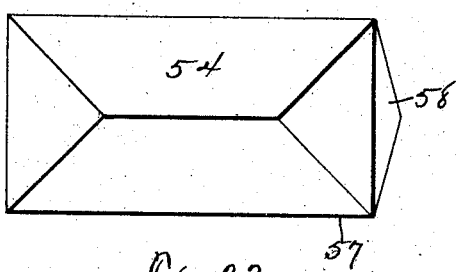
Figure 22:
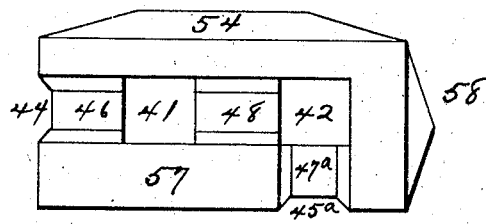

Referring to Figs. 17 and 20, it is the function of the cores 27 28 to form holes 41 42 in a block 43, of the cores 36 37 to form grooves or channels 44 45 across the ends of said block, of the cores 38 40 to form grooves or channels 46 47, connecting the end channels with the holes, and of the core 39 to form a groove or channel 48, connecting the holes. The blocks so molded are laid in the wall with the plane top of the block upward and the channeled bottom of the block downward, the various channels and holes in the various blocks coöperating to produce a single sinuous and checkered opening or interior in the wall. In molding a corner-block, such as 43$^a$ in Fig. 18, the core 37 is removed from the pattern-plate 35, and the core 40 is removed from the plate 24, and said cores are attached to the pattern-plate 34 or 35 and the plate 24 in the positions shown by dotted lines in Fig. 1. In the adjusted positions the core 37 forms a groove or channel 45$^a$ in the inner face of the block and the core 40 forms a groove or channel 47$^a$ in the bottom of the block and connecting the hole 42 and channel 45$^a$. Various similar adjustments of the cores 36, 37, 38, 39, and 40 may be made to establish and produce various forms of wall-cavities. A pattern-plate 49, Figs. 7 and 9, may be substituted for either of the pattern-plates 24, 32, or 33 and when so substituted will form an imitation-stone face on the block. The pattern-plate 49 preferably is made of a frame 50 overlaid by a face-plate formed of battered sheet metal, the indentations and creases produced in battering the sheet metal giving the desired pattern to the stone or block. In molding a corner-block with an imitation stone face it is desirable at times to form an imitation stone end on said block, and this may be done by substituting a pattern-plate 51, Figs. 8 and 10, for one or another of the pattern-plates 34 or 35. The pattern-plate 51 preferably is made of a frame 52, overlaid by a face-plate of battered sheet metal, the indentations and creases produced in battering the sheet metal giving the desired pattern to the block. The pattern-plate 49 can be substituted for the plate 24 only when a solid block is to be molded. It sometimes is desirable to mold a block 53 with a hipped face 54, and such end may be accomplished by substituting a pattern-plate 55, Figs. 11 and 13, for one or another of the pattern-plates 32 or 33, the hipped cavity 56 in the pattern-plate 55 giving the desired face to the block. In molding a corner-block, such as 57, Figs. 21 and 22, it may be desirable to form a pyramidal face 58 on one of its ends, and such result may be attained by substituting a pattern-plate 59, Figs. 12 and 14, for one or another of the pattern-plates 34 or 35, the pyramidal cavity 60 in the substituted plate giving the desired shape to the end of the block. By substituting various differently-formed pattern-plates I am enabled to produce building-blocks presenting any desired face in imitation of cut stone, uncut stone, and other material indefinitely.

Figure 23:
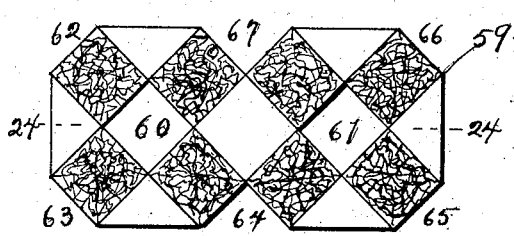
Figure 24:
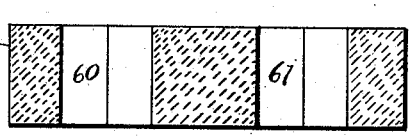

In Figs. 23 and 24 I show a block 59 having holes 60 61, formed by the cores 27$^a$ 28$^a$, Fig. 6, and notches 62, 63, 64, 65, 66, and 67, formed in its margins by cores 68, 69, 70, 71, 72, and 73, fixed to the side and end plates of the pattern of the mold. This block 59 is desirable in forming friezes, dadoes, aprons, and the like and preferably is made thinner than the regular building-blocks by placing a false bottom between the bottom 14 of the mold and a pattern-plate 74. The pattern-plate 74 then forms the face of the block and in this instance is illustrated as made up of squares 75, shaped to imitate stone, a central square having a plane face 76, the squares set obliquely to the square of the mold, and triangular plane faces 77 between the marginal cores. Any desired face may be formed on the block 59 by substituting for the pattern-plate 74 a plate having a different and desired face. The sides 10 11 of the mold are of less height than the ends 12 13 and pattern-plates mounted thereon, and a hopper is provided and formed with side boards 78 79, resting at times on the pattern-plates 32 33 (or others substituted therefor) and formed with bases 80 81, fixed to the side boards and extending into positions of rest on the sides 10 11. End boards 82 83 are fixed to and connect the ends of the side boards and rest at times on the end pattern-plates 34 35, (or others substituted therefor.) The side and end boards 78 79 82 83 are set obliquely to the sides and ends of the mold and flare outwardly therefrom to form a hopper above the mold, the inner edges of the lower portion of the hopper being flush with the upper inner edges of the side and end pattern-plates. Grooves 84 85 are formed in the end boards 82 83, a groove 86 is formed in the side board 78, and a slot 87 is formed in the side board 79 and base 81. A screed 88, preferably formed of sheet metal, is mounted at times through the slot 87 and is seated in the grooves 84, 85, and 87. The screed is employed to cut the surplus composition from the top of the block after the composition has been tamped in the mold and serves, in conjunction with the hopper, to lift the surplus material away from the mold and deposit the same in another mold or retain it until the first mold is removed from the block. In the use of the hopper and screed I am enabled to save all the material and at the same time cut a uniform and plane face on the molded block. After a block is molded I invert the mold on a plane bed of sand, release the hook 21 from the lip 20, move the side 10 outward, then move the end 13 outward, then move the side 11 outward, and then move the end 12 outward. In moving the sides and ends of the mold outward the pattern-plates are moved outward and away from the block. When a hollow block is molded in the device, the bottom 14 and cores 27 28 are removed after the mold is inverted. In either event the bottom 14 and pattern-plate 24 are removed after the mold is inverted and before the sides and ends of the mold are removed from the block.

I claim as my invention—

1. A mold, comprising sides, an end hinged to and overlapping the ends of both sides, an end hinged to and overlapping the opposite end of one side and also overlapping the other side, means for locking said ends to said other side, a removable bottom, a pattern-plate removably mounted on said bottom and embraced by said sides and ends, and cores on said removable bottom.

2. An artificial-stone mold, comprising sides, an end hinged to both sides, an end hinged to one side, a hook-bar fixed to the other side and having its hook engaging the free end, a lip on said hook-bar, a hook pivoted on the latter end and adapted to engage said lip, a removable bottom, a pattern-plate removably mounted on said bottom and embraced by said sides and ends, and cores on said removable bottom.

3. A mold, comprising sides, an end hinged to both sides, an end hinged to one side and overlapping the end of the other side, a hook-bar fixed to said other side and having its hook engaging the free end, a lip on said hook bar, a hook pivoted on the latter end and adapted to engage said lip and draw said hook-bar and side toward said end, a removable bottom, a pattern-plate removably mounted on said bottom and embraced by said sides and ends, cores on said removable bottom extending loosely through said pattern-plate, and a hopper removably and replaceably mounted on said sides and ends.

4. An artificial-stone mold, comprising sides and ends and a removable bottom, a hopper removably and replaceably mounted on the sides and ends, and a screed extending transversely of the mold and hopper flush with the top of the mold.

5. An artificial-stone mold, comprising sides and ends and a removable bottom, a hopper removably and replaceably mounted on the sides and ends, one side of said hopper and the ends thereof formed with interior grooves, the other side of said hopper formed with a slot, and a screed mounted in and movable transversely through said slot flush with the top of said sides and ends to a seat in said grooves.

6. A mold, comprising sides and ends hinged and locked together, a removable bottom, a pattern-plate removably mounted on said bottom and embraced by said sides and ends, and pattern-plates removably mounted on the inner faces of said sides and ends.

7. A mold, comprising sides, ends and a removable bottom, pattern-plates independent of each other removably and replaceably mounted on the sides, the ends and the bottom, the pattern-plate on the bottom embraced by said sides and ends, cores on the bottom adapted to form apertures in a block, and extending through the pattern-plate on the bottom, and cores on the side and end pattern-plates adapted to form grooves in said block parallel with said apertures.

8. A mold, comprising sides, ends and a removable bottom, pattern-plates removably mounted on said sides, ends and bottom, cores fixed on said bottom and loosely extending through apertures in the bottom pattern-plate and adapted to form apertures in a block, cores on the end pattern-plate adapted to form grooves in said block parallel with said apertures, and cores on the bottom pattern-plate adapted to form grooves in said block connecting the apertures and end grooves thereof.

Signed by me at Topeka, Kansas, this 30th day of June, 1904.

EDGAR E. CROUCH.

Witnesses:
  A. L. REDDEN,
  R. B. GILLULY.